United States Patent
Griffis et al.

(10) Patent No.: US 6,401,919 B1
(45) Date of Patent: Jun. 11, 2002

(54) PACKAGE FOR A SOFTWARE APPLICATION

(75) Inventors: Gillian M. Griffis, San Jose; Elisa Y. L. Chan, South San Francisco, both of CA (US); Sok Eng Siek, Singapore (SG)

(73) Assignee: Adaptec, Inc., Milpitas, CA (US)

( * ) Notice: Subject to any disclaimer, the term of this patent is extended or adjusted under 35 U.S.C. 154(b) by 0 days.

(21) Appl. No.: 09/545,148

(22) Filed: Apr. 7, 2000

(51) Int. Cl.[7] ............................................. B65D 85/57
(52) U.S. Cl. ............................. 206/307.1; 206/308.1; 206/425; 206/232; 229/67.3
(58) Field of Search .................... 206/308.1, 307.1, 206/308.3, 309, 311, 312, 313, 425, 497, 486, 232; 229/67.1, 67.3, 67.4, 71, 72; 40/359

(56) References Cited

U.S. PATENT DOCUMENTS

| | | | | |
|---|---|---|---|---|
| 2,333,798 A | * | 11/1943 | Kner ........................... 229/67.3 |
| 4,294,400 A | * | 10/1981 | Gendron ...................... 229/67.3 |
| 4,640,413 A | * | 2/1987 | Kaplan et al. .............. 206/232 |
| 4,762,225 A | * | 8/1988 | Henkel ......................... 206/311 |
| 5,062,530 A | * | 11/1991 | Mitsuyama .................. 206/425 |
| 5,125,561 A | * | 6/1992 | Idstein ......................... 229/71 |
| 5,263,581 A | * | 11/1993 | Rosen .......................... 206/313 |
| 5,288,144 A | * | 2/1994 | Guderyon .................... 312/183 |
| 5,318,222 A | * | 6/1994 | Bartlett ......................... 229/72 |
| 5,522,500 A | * | 6/1996 | Mori ......................... 206/308.1 |
| 5,662,217 A | * | 9/1997 | Durr ......................... 206/308.1 |
| 5,895,165 A | * | 4/1999 | Mogelonsky ................ 402/79 |
| 5,947,279 A | * | 9/1999 | Lee et al. .................... 206/232 |
| 6,082,612 A | * | 7/2000 | Black ......................... 229/67.1 |

* cited by examiner

*Primary Examiner*—Shian Luong
(74) *Attorney, Agent, or Firm*—Martine & Penilla, LLP

(57) ABSTRACT

A package includes first and second panels defining a compartment having an opening. One of the first and second panels has slits formed therein for receiving a computer readable media. The package also includes a flap for closing the opening of the compartment. In a method for packaging a software application, stable components including a first computer readable media having a version of the software application thereon are placed in a compartment defined by inner surfaces of first and second panels of a package. A second computer readable media having an updated version of the software application thereon is then removably mounted on an outer surface of one of the first and second panels of the package.

4 Claims, 8 Drawing Sheets

PACKAGE FOR A SOFTWARE APPLICATION

BACKGROUND OF THE INVENTION

The present invention relates to packaging and, more particularly, to a package and a method for packaging a software application.

Software applications are typically delivered to original equipment manufacturers (OEMs) on a computer readable media such as, for example, a compact disc (CD). The computer readable media is typically accompanied by documentation for the end user such as, for example, a registration card, a copyright disclaimer card, and a product information guide. In one known method for packaging software applications for delivery to OEMs, a CD having the software application stored thereon and the accompanying documentation are first placed in an envelope-like package and then the flap of the package is sealed. Thereafter, the package is shipped to an OEM so that the software application can be either installed on or shipped with a computer or other board product.

Software applications are frequently changed to, for example, fix bugs and add new features. In fact, many software applications are changed on a monthly basis. Unfortunately, the known method for packaging software applications described above is not well suited for handling such frequent changes. Each time the software application is changed, any packages in inventory must be entirely rebuilt because such packages cannot be opened to substitute a new CD or insert a diskette without being destroyed.

The process of rebuilding each package each time the software applications is changed is highly inefficient for at least two reasons. First, destroying the packages containing the old version of the software application wastes packaging material. Second, the rebuilding process requires a significant amount of labor and is therefore expensive. To minimize the effect of these drawbacks, software application providers may opt to generate packaged software applications only when an order is received, rather than keeping a significant quantity of packaged software applications in inventory. This approach may be unacceptable, however, because the time required to generate packaged software applications delays the delivery of the product to an OEM.

In view of the foregoing, what is needed is a method for packaging a software application that efficiently accommodates frequent changes to the software application.

SUMMARY OF THE INVENTION

Broadly speaking, the present invention fills this need by providing a method for packaging a software application in which a computer readable media having an updated version of the software application thereon is removably mounted on an exterior surface of a package. The present invention also provides a package that may be used to package a software application.

In accordance with one aspect of the present invention, a package is provided. The package includes first and second panels that define a compartment having an opening, and a flap for closing the opening of the compartment. One of the first and second panels has slits formed therein for receiving a computer readable media.

In one embodiment, the compartment is configured to receive a first computer readable media, and the computer readable media received in the slits formed in one of the first and second panels is a second computer readable media. In one embodiment, the first computer readable media is a compact disc and the second computer readable media is a diskette. In one embodiment, the package further includes first and second side panels extending between the first and second panels. The first and second side panels are configured to allow expansion of the compartment.

In one embodiment, the slits formed in the first and second panels include a first slit and a second slit, with each of the first and second slits having a first end, a vertical segment, a horizontal segment, and a second end. In one embodiment, the vertical segments of the first and second slits have a first length and the horizontal segments of the first and second slits have a second length, with the first length being longer than the second length. In one embodiment, the vertical segments of the first and second slits are substantially parallel to one another, and the horizontal segments of the first and second slits extend away from their respective vertical segments in opposite directions. In one embodiment, a transition region is provided at the first and second ends of each of the first and second slits. The transition region is configured to prevent the panel in which the slits are formed from tearing.

In accordance with another aspect of the present invention, a method for packaging a software application is provided. In this method stable components are placed in a compartment defined by the inner surfaces of the first and second panels of a package. The stable components include a first computer readable media having a version of the software application thereon. A second computer readable media having an updated version of the software application thereon is then removably mounted on an exterior surface of one of the first and second panels of the package.

In one embodiment, the first computer readable media is a compact disc and the second computer readable media is a diskette. In one embodiment, the second computer readable media is removably mounted in slits formed in one of the first and second panels. In one embodiment, the stable components further include at least one of a serial number card, a product registration card, a product information sheet, and a copyright disclaimer card.

In one embodiment, a flap seals an opening of the compartment and the method further includes sealing the flap with a label having information associated with the contents of the compartment. In one embodiment, the method further includes shrink wrapping the package and, if desired, placing a label having information identifying the updated version of the software application on the shrink wrap.

In the event the software application is changed after the package has been assembled, the method further includes the operations of removing the second computer readable media from the outer surface of one of the first and second panels of the package, and removably mounting a third computer readable media having an updated version of the software application thereon on the outer surface of one of the first and second panels of the package. The updated version of the software application on the third computer readable media is more recent than the updated version of the software application on the second computer readable media. In one embodiment, the third computer readable media is a diskette. If necessary, before the operation of removing the second computer readable media, the method may further include the operation of removing shrink wrap from the package. If desired, once the third computer readable media has been removably mounted on the package, the method may further include the operations of shrink wrapping the package and affixing a label having information identifying the updated version of the software application to the shrink wrap.

The package and method for packaging a software application of the present invention enable a software application provider to accommodate frequent changes to a software application efficiently. In particular, the package and method of the present invention obviate the need to rebuild packages entirely when the software application is changed. This is significant because it not only avoids wasting packaging material, but also enables a software application provider to keep packaged software applications in inventory without having to incur the costs associated with rebuilding the packages entirely when the software application is changed. By shipping packaged software applications to distribution sites located near customers, a software application provider may significantly shorten delivery times to customers. When the software application is changed, the packaged software applications can be updated at the distribution sites simply by replacing the diskette (or other computer readable media) on the exterior of the package with another diskette (or other computer readable media) on which an updated version of the software application is stored.

It is to be understood that the foregoing general description and the following detailed description are exemplary and explanatory only and are not restrictive of the invention, as claimed.

BRIEF DESCRIPTION OF THE DRAWINGS

The accompanying drawings, which are incorporated in and constitute part of this specification, illustrate exemplary embodiments of the invention and together with the description serve to explain the principles of the invention.

DETAILED DESCRIPTION OF THE INVENTION

Several exemplary embodiments of the invention will now be described in detail with reference to the accompanying drawings.

Figure 1:
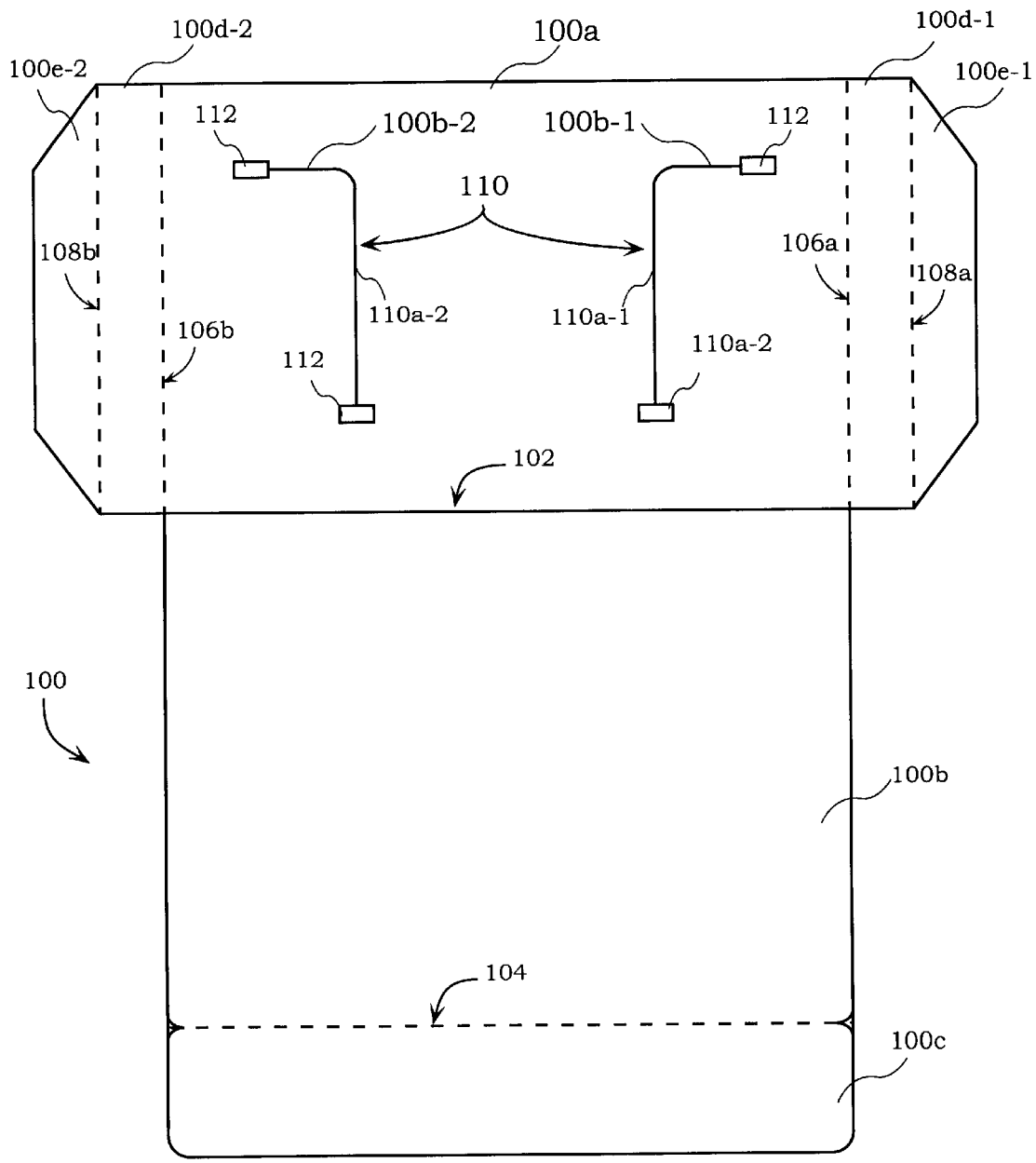
FIG. 1 shows a package before being assembled in accordance with one embodiment of the invention.

FIG. 1 shows package 100 before being assembled in accordance with one embodiment of the invention. As shown therein, package 100 is comprised of a single piece of material that is assembled to form the final package structure, as described in more detail below. The formation of package 100 from a single piece of material is preferred because it simplifies the assembly process. If desired, however, package 100 may be formed from two or more pieces of material. The material from which package 100 is formed may be selected to suit the needs of the particular application for which the package is intended. Representative materials from which package 100 may be formed include heavy weight paper, coated paper, card stock, cardboard, and synthetic materials. In one embodiment, package 100 is formed from 210 gsm artcard paper.

Referring to FIG. 1, package 100 includes first panel 100a and second panel 10b, which are separated by fold line 102. Flap 100c extends from second panel 100b and is separated from second panel 100b by fold line 104. Side panels 100d-1 and 100d-2 extend outwardly from opposing sides of first panel 100a and are separated from the panel by fold lines 106a and 106b, respectively. Tab 100e-1 extends from side panel 100d-1 and is separated from the side panel by fold line 108a. Tab 100e-2 extends from side panel 100d-2 and is separated from the side panel by fold line 108b.

Two slits 110 are provided in first panel 100a. One slit 110 includes vertical segment 110a-1 and horizontal segment 110b-1 and the other slit 110 includes vertical segment 110a-2 and horizontal segment 110b-2. Slits 110 are generally L-shaped, with vertical segments 110a-1 and 110a-2 forming the longer leg of the L-shape and horizontal segments 110b-1 and 110b-2 forming the shorter leg of the L-shape. Vertical segments 110a-1 and 110a-2, each of which is substantially perpendicular to the exposed outer edge of panel 110a, are substantially parallel to each other. Horizontal segment 110b-1, which is substantially perpendicular to vertical segment 110a-1, extends away from vertical segment 110a-1 in the direction of side panel 100d-1. Horizontal segment 110b-2, which is substantially perpendicular to vertical segment 110a-2, extends away from vertical segment 110a-2 in the direction of side panel 100d-2. As such, horizontal segments 110b-1 and 110b-2 extend away from their respective vertical segments 110a-1 and 110a-2 in opposite directions. Rectangular transition regions 112 are provided at each of the ends of slits 110. The function of slits 110 and transition regions 112 is described in detail below.

Figure 2:
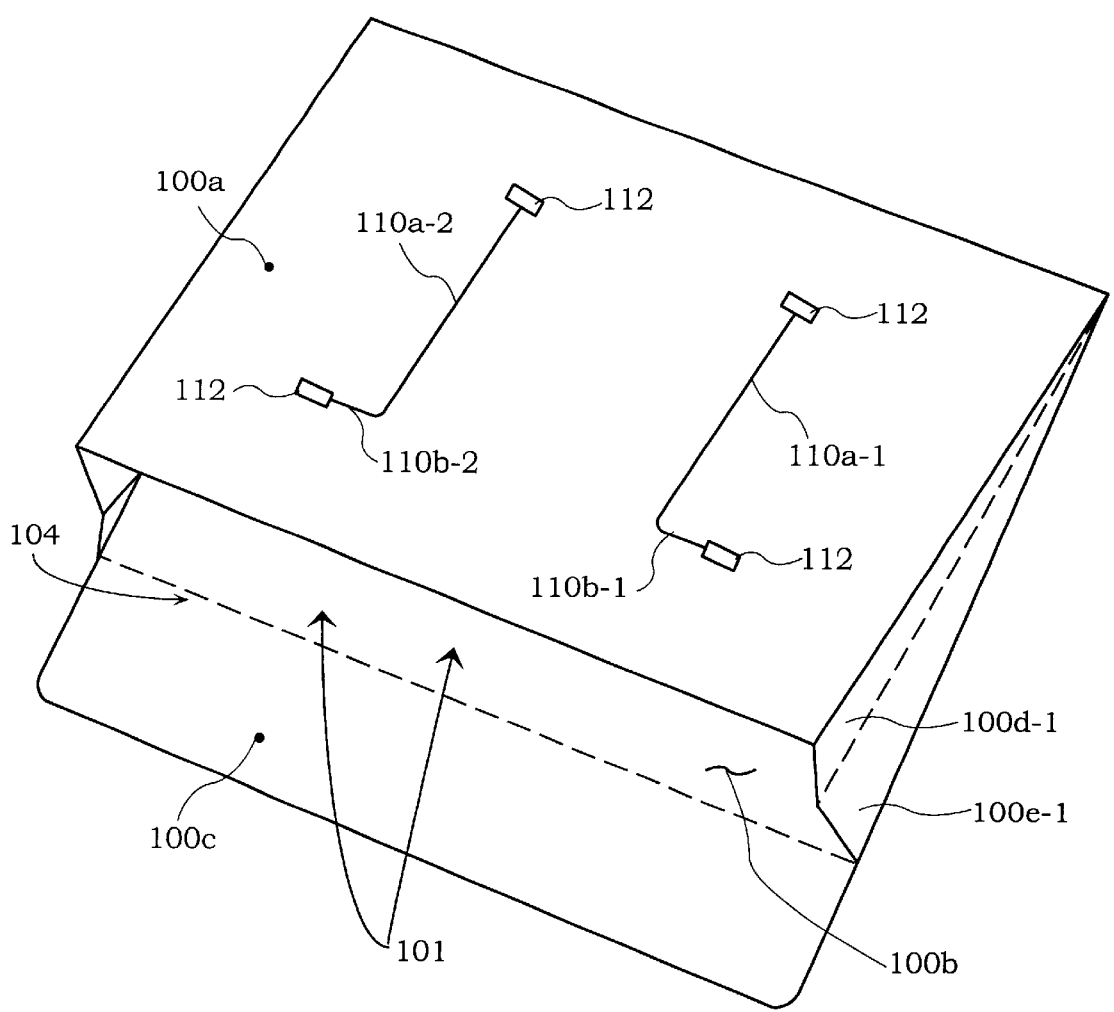
FIG. 2 is a perspective view of the package after being assembled from the single piece of material shown in FIG. 1 in accordance with one embodiment of the invention.

FIG. 2 is a perspective view of package 100 after being assembled from the single piece of material shown in FIG. 1 in accordance with one embodiment of the invention. As shown in FIG. 2, package 100 includes compartment 101, which is defined by first and second panels 100a and 100b and side panels 100d-1 and 100d-2. One method for assembling the single piece of material shown in FIG. 1 into assembled package 100 shown in FIG. 2 will now be described with reference to both FIGS. 1 and 2. Side panel 100d-1 and tab 100e-1 are folded inwardly along fold line 106a so that the top surfaces thereof, i.e., the surfaces visible in FIG. 1, face the top surface of first panel 100a. Tab 100e-1 is then folded back along fold line 108a so that the top surface thereof faces up. Next, side panel 100d-2 and tab 100e-2 are folded inwardly along fold line 106b so that the top surfaces thereof face the top surface of first panel 100a. Tab 100e-2 is then folded back along fold line 108b so that the top surface thereof faces up. First and second panels 100a and 100b are then folded together along fold line 102 so that second panel 110b can be attached to the top surfaces of tabs 100e-1 and 100e-2. Second panel 100b may be attached to tabs 100e-1 and 100e-2 using any suitable joining technique, e.g., gluing, taping, and stapling. In one embodiment, a machine gluing operation is used to attach second panel 100b to the top surfaces of tabs 100e-1 and 100e-2. As shown in FIG. 2, flap 100c is in the open position. To close compartment 101, flap 100c is folded along fold line 104 over first panel 100a.

Figure 3:
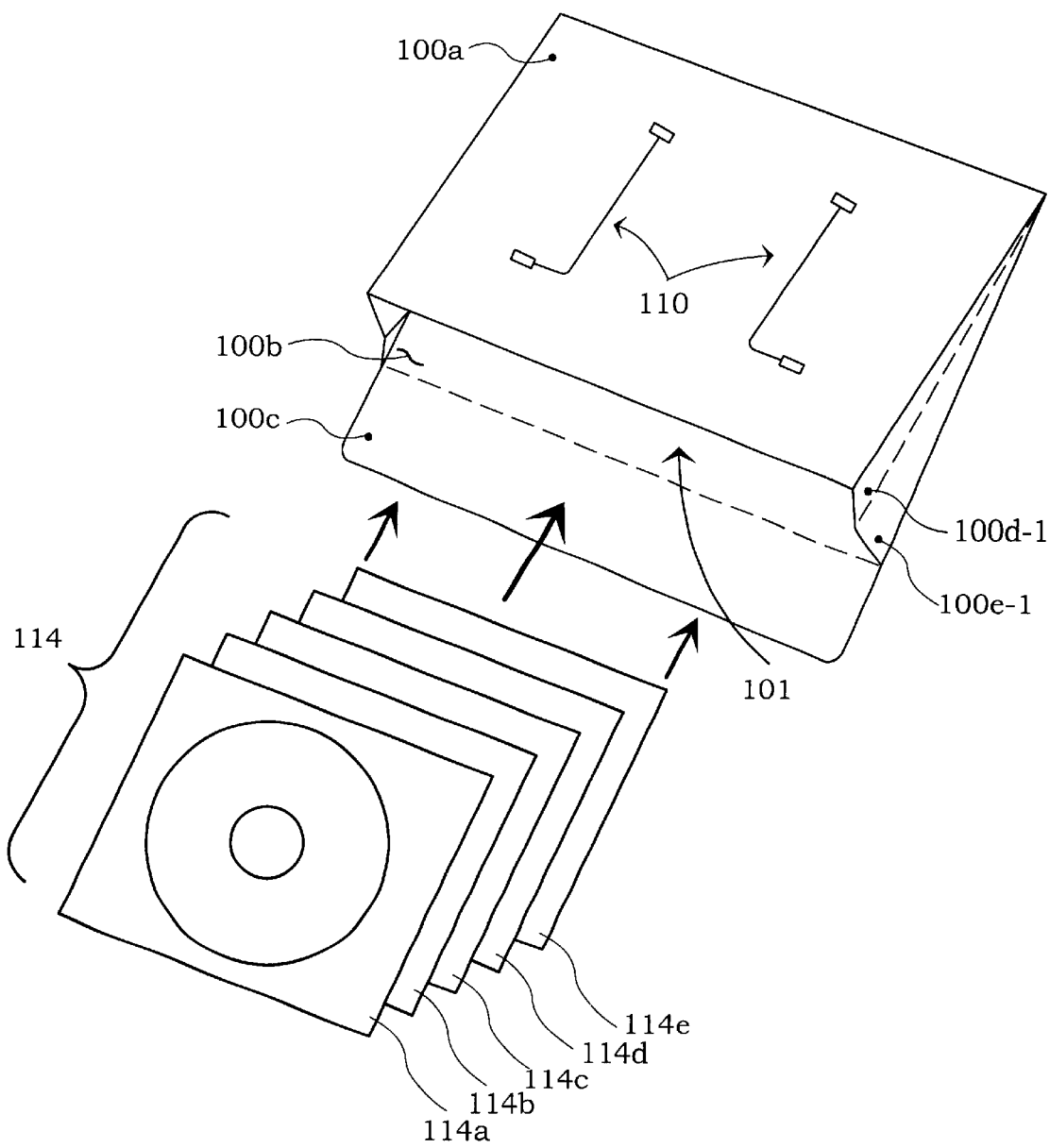
FIG. 3 shows the stable components of a software application in the process of being inserted into a package in accordance with one embodiment of the invention.

FIG. 3 shows the stable components of a software application in the process of being inserted into a package in accordance with one embodiment of the invention. As shown therein, stable components 114 being inserted into compartment 101 of package 100 include first computer readable media 114a on which a version of the software application is stored, serial number card 114b, product registration card 114c, product information sheet 114d, and copyright disclaimer card 114e. As used herein, the term "stable components" means those items that may be packaged and shipped with a software application and will remain current and accurate regardless of whether the software code is updated frequently. It will be apparent to those skilled in the art that the stable components may be varied from those shown in FIG. 3 to suit the needs of particular situations.

The first computer readable media 114a may be any suitable computer readable media on which data can be stored. In one embodiment, first computer readable media 114a is a compact disc (CD) on which a version of the software application is stored. If desired, the CD may be part of an assembly including a card on which the CD is mounted or a sleeve within which the CD is disposed. Alternatively, first computer readable media 114a may be a diskette, e.g., a standard 3.5-inch computer diskette. In one embodiment, product information sheet 114d is a quick-start card providing information concerning installation and start-up of the software application.

Figure 4:
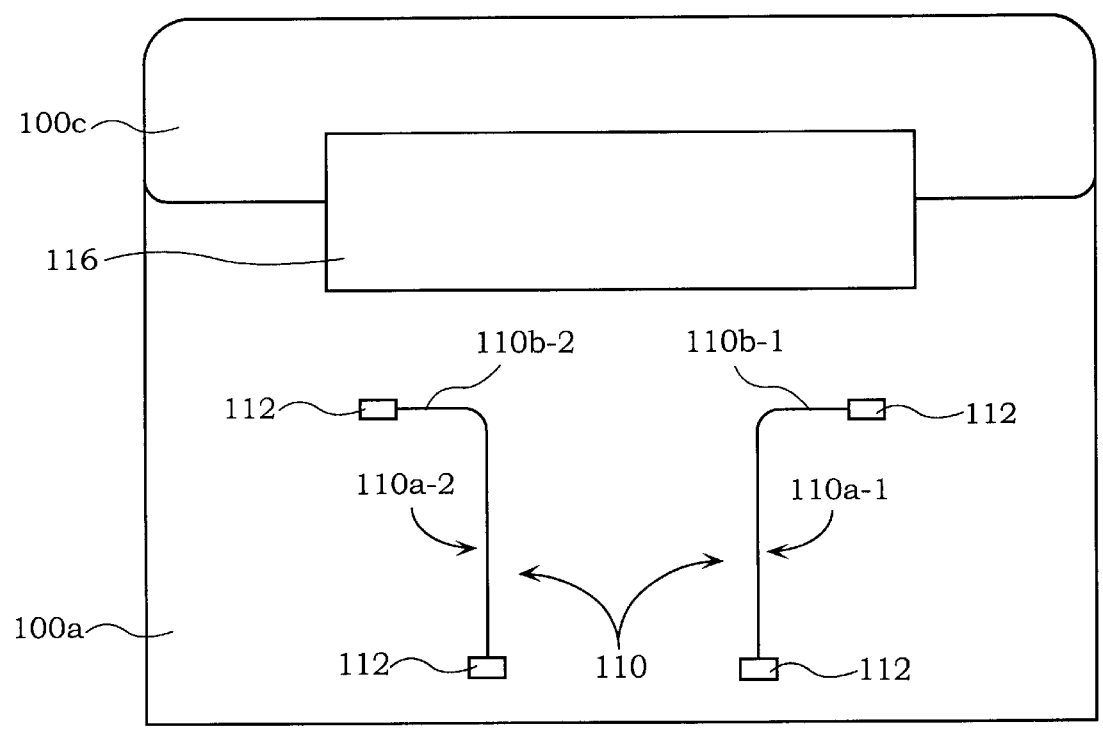
FIG. 4 shows a package with a flap held in the closed position in accordance with one embodiment of the invention.

FIG. 4 shows package 100 with flap 100c held in the closed position in accordance with one embodiment of the invention. As shown therein, self-adhesive label 116 seals flap 100c against first panel 100a and thereby holds the flap in the closed position. Label 116 has information associated with the contents of compartment 101 (see FIG. 3) printed or otherwise provided thereon. As shown in FIG. 4, the information provided on label 116 includes a part number, e.g., the part number of the software application, a serial number, e.g., the serial number of a board product or other hardware supported by the software application, and the version of the software application on the first computer readable media, e.g., Rev. A. The information provided on the label may be varied from that shown in FIG. 4 to suit the needs of particular situations.

In situations in which the contents of the compartment do not have to be identified on the exterior of the package 100, the use of a label may be omitted. When a label is not used, flap 100c may be held in the closed position using other joining methods. By way of example, flap 100c may be sealed against first panel 100a using glue, single- or double-sided tape, a mechanical fastener, or shrink wrap. If desired, flap 100c may first be sealed against first panel 100a using glue, tape, or a mechanical fastener and then a label may be affixed to the thus-sealed flap. Alternatively, flap 100c may be folded along fold line 104 (see, e.g., FIG. 2) and left unsecured to first panel 10a until the package is shrink wrapped, as described below in connection with FIG. 6.

Figure 5:
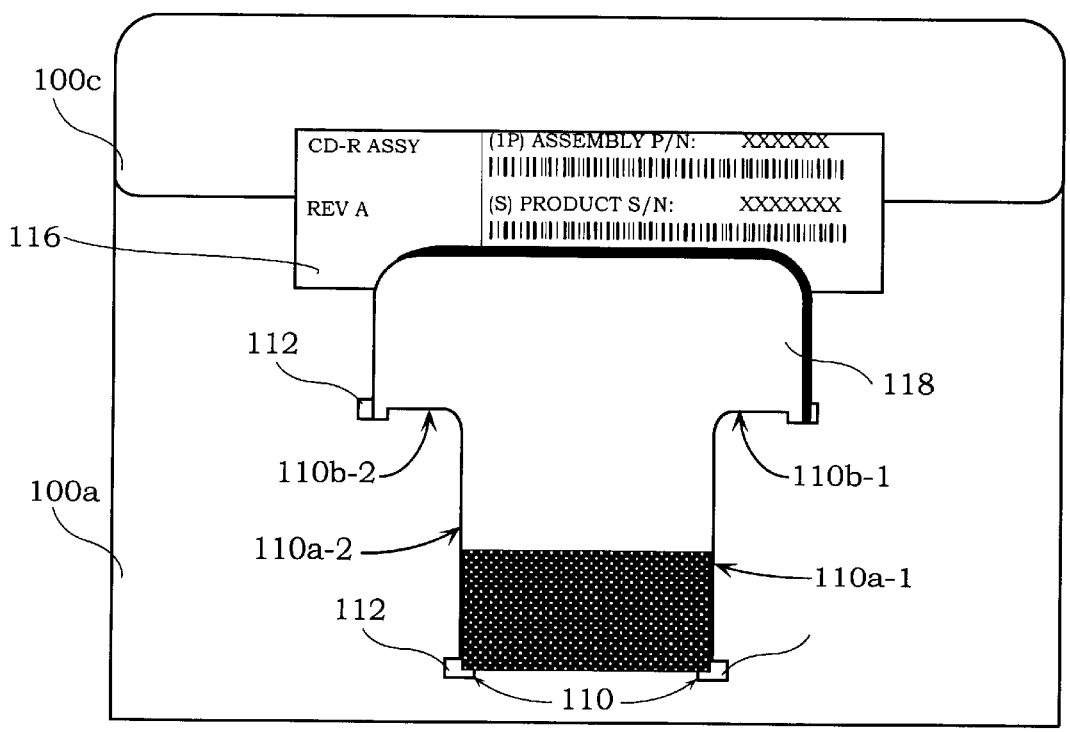
FIG. 5 shows an assembled package with a diskette removably mounted on the exterior thereof in accordance with one embodiment of the invention.

FIG. 5 shows an assembled package with a second computer readable media removably mounted on an exterior surface of a package in accordance with one embodiment of the invention. As shown therein, second computer readable media 118 is removably mounted in slits 110 formed in first panel 100a. Second computer readable media 118 may be any suitable computer readable media on which data can be stored. In one embodiment, second computer readable media 118 is a diskette on which an updated version of the software application on the first computer readable media 114a (see FIG. 3) is stored. As used in connection with the description of the invention, the phrase "updated version of the software application" means the software code necessary to bring a version of the software application up to date and need not be a complete version of the software application.

As shown in FIG. 5, the configuration of slits 110 defines a pocket-like structure in first panel 100a that receives second computer readable media 118. This configuration, which includes a pair of inverted, L-shaped slits oriented in opposite directions, has been found to be well suited for removably mounting a diskette on the exterior surface of first panel 100a. If second computer readable media 118 is a CD or other type of computer readable media, then it may be desirable to change the configuration of the slits from that shown in FIG. 5. By way of example, alternative slit configurations include a pair of diagonal slits forming a "V" shape and a semi-circular slit.

When second computer readable media 118 is mounted in slits 110, transition regions 112 provided at the ends of the slits resist tearing of first panel 100a by dissipating the stresses generated at the ends of the slits. As shown in FIG. 5, transition regions 112 have a generally rectangular shape, but other suitable configurations that dissipate stress concentration at the ends of the slits also may by used. By way of example, the transition regions may have a generally circular shape or a triangular shape. If desired, transition regions 112 may be reinforced with stitching, tape, or other suitable reinforcement material to provide increased resistance to tearing of the panel at the ends of the slits.

Figure 6:
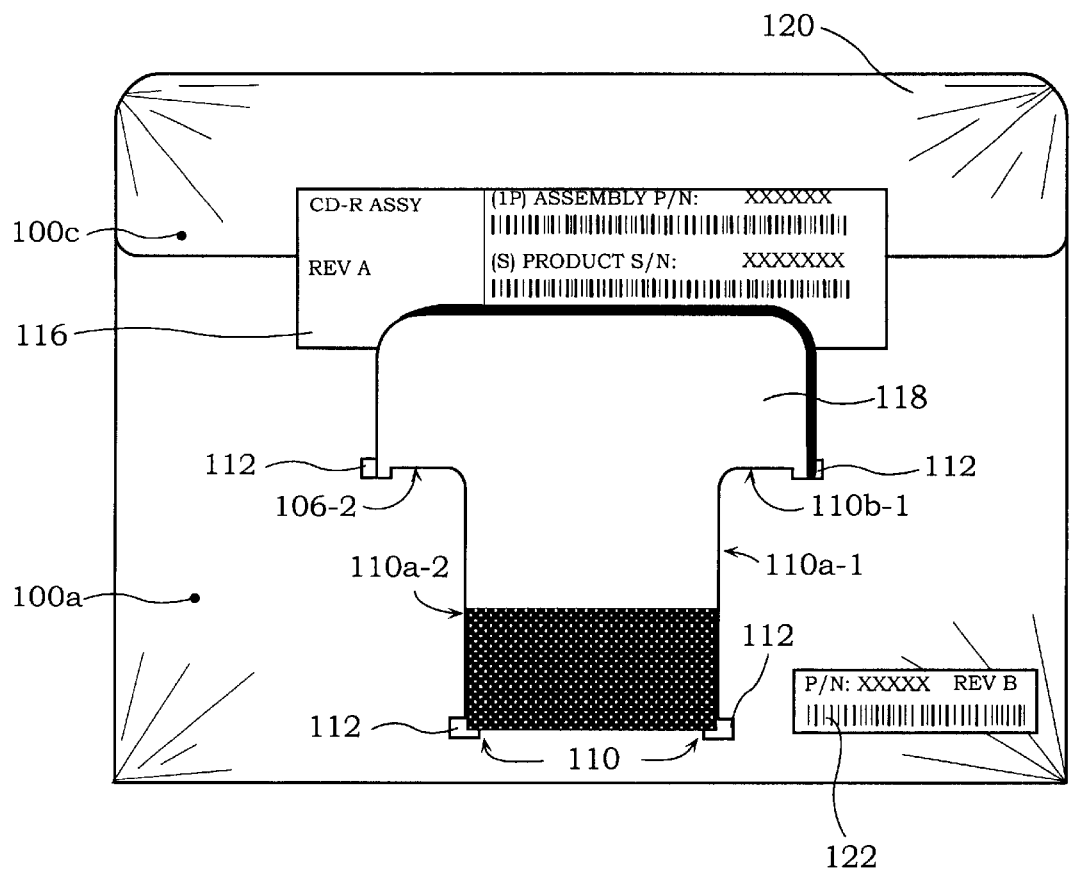
FIG. 6 shows the assembled package of FIG. 5 after being shrink wrapped in accordance with one embodiment of the invention.

FIG. 6 shows the assembled package of FIG. 5 after being shrink wrapped in accordance with one embodiment of the invention. As shown therein, shrink wrap 120, which may be applied using well-known techniques, surrounds the entirety of package 100. Shrink wrapping package 100 not only prevents second computer readable media 118 from being inadvertently separated from the package, but also protects the package from undetected tampering. Label 122 is affixed to shrink wrap 120, preferably at one of the lower corners of package 100. In one embodiment, label 122 is a self-adhesive label that identifies the updated version of the software application stored on second computer readable media 118, which is mounted on the exterior of package 100. The identifying information printed or otherwise provided on label 122 may include the software application name and part number, the version letter (or number) of the updated version of the software application stored on the second computer readable media (e.g., Rev. B, Update Rev. B, Version 3.2.1, etc.), or any other information required to suit the needs of particular situations. In situations where it is not necessary to identify the updated version of the software application stored on second computer readable media, label 122 may be omitted.

Figure 7:
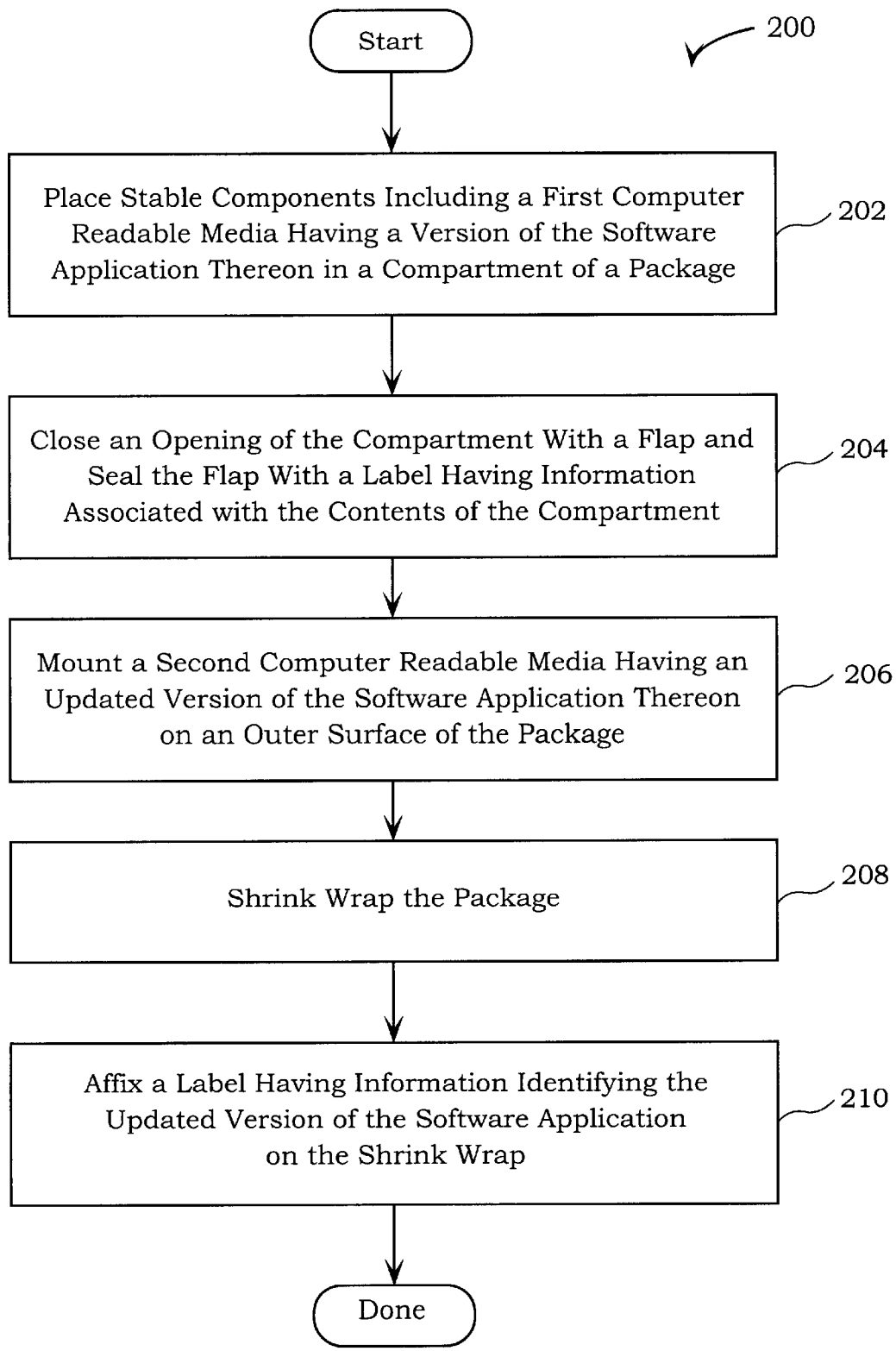
FIG. 7 is a flowchart diagram illustrating the method operations performed in packaging a software application in accordance with one embodiment of the invention.

FIG. 7 is a flowchart diagram 200 illustrating the method operations performed in packaging a software application in accordance with one embodiment of the present invention. The method begins with operation 202 in which the stable components of the software application are disposed within a compartment of a package. In one embodiment, the package has the configuration shown in FIG. 3. It will be apparent to those skilled in the art; however, that the method may be implemented using a package having a configuration different from that shown in FIG. 3. In one embodiment, the stable components include a first computer readable media having a version of the software application thereon. The first computer readable media may be any suitable computer readable media, e.g., a CD or a diskette. In addition to the first computer readable media, the stable components also may include documentation to be distributed with the software application. By way of example, such documentation may include one or more of a serial number card, a product registration card, a product information sheet, and a copyright disclaimer card.

Once the stable components are placed in the compartment, the method proceeds to operation 204 in which the opening of the compartment is closed with a flap. The flap may be sealed in the closed position using any suitable technique. By way of example, the flap may be sealed in the closed position with glue (or other adhesive material), tape, or a self-adhesive label. In one embodiment, the flap is sealed with a label, e.g., a self-adhesive label, on which information associated with the contents of the compartment is provided. By way of example, the information provided on the label may include one or more of a part number, a serial number, and the version of the software application. If desired, the information may be provided on the label in a machine-readable format, e.g., bar code, so that the label can be read by a computer for a business purpose, e.g., to monitor inventory or to track the location of the package.

Next, in operation 206, a second computer readable media having an updated version of the software application thereon is mounted on an outer surface of the package. The second computer readable media may be any suitable computer readable media, e.g., a CD or a diskette. In one embodiment, the second computer readable media is a diskette. The second computer readable media may be mounted on the outer surface of the package using any suitable technique. For example, the second computer read able media may be taped or otherwise affixed to the outer surface of the package or inserted in s lit s formed in the outer surface of the package. In one embodiment in which the second computer readable media is a diskette, the diskette may be mounted on the outer surface of the package by forming slits having an appropriate configuration, e.g., the configuration shown in FIG. 5, in one of the panels and inserting the diskette into the slits.

In operation 208, the thus-assembled package is shrink wrapped. The package may be shrink wrapped using well-known shrink wrapping techniques. Finally, in operation 210, a label is affixed to the shrink wrap. In one embodiment, this label is a self-adhesive label on which information identifying the updated version of the software application stored on the second computer readable media is provided. If desired, additional information such as, for example, a part number or a serial number also may be provided on the label. As noted above regarding the label used in operation 204, the information may be provided on the label in a machine-readable format, e.g., bar code, so that the label can be read by a computer for a business purpose, e.g., to monitor inventory or to track the location of the package. Once the label is affixed to the shrink wrap, the method is done.

In the foregoing method for packaging a software application, it will be apparent to those skilled in the art that one or both of operations 208 and 210 may be omitted. In the event operation 208 is omitted and the package is therefore not shrink wrapped, operation 210 may be modified so that the label is applied directly to an outer surface of the package.

Figure 8:
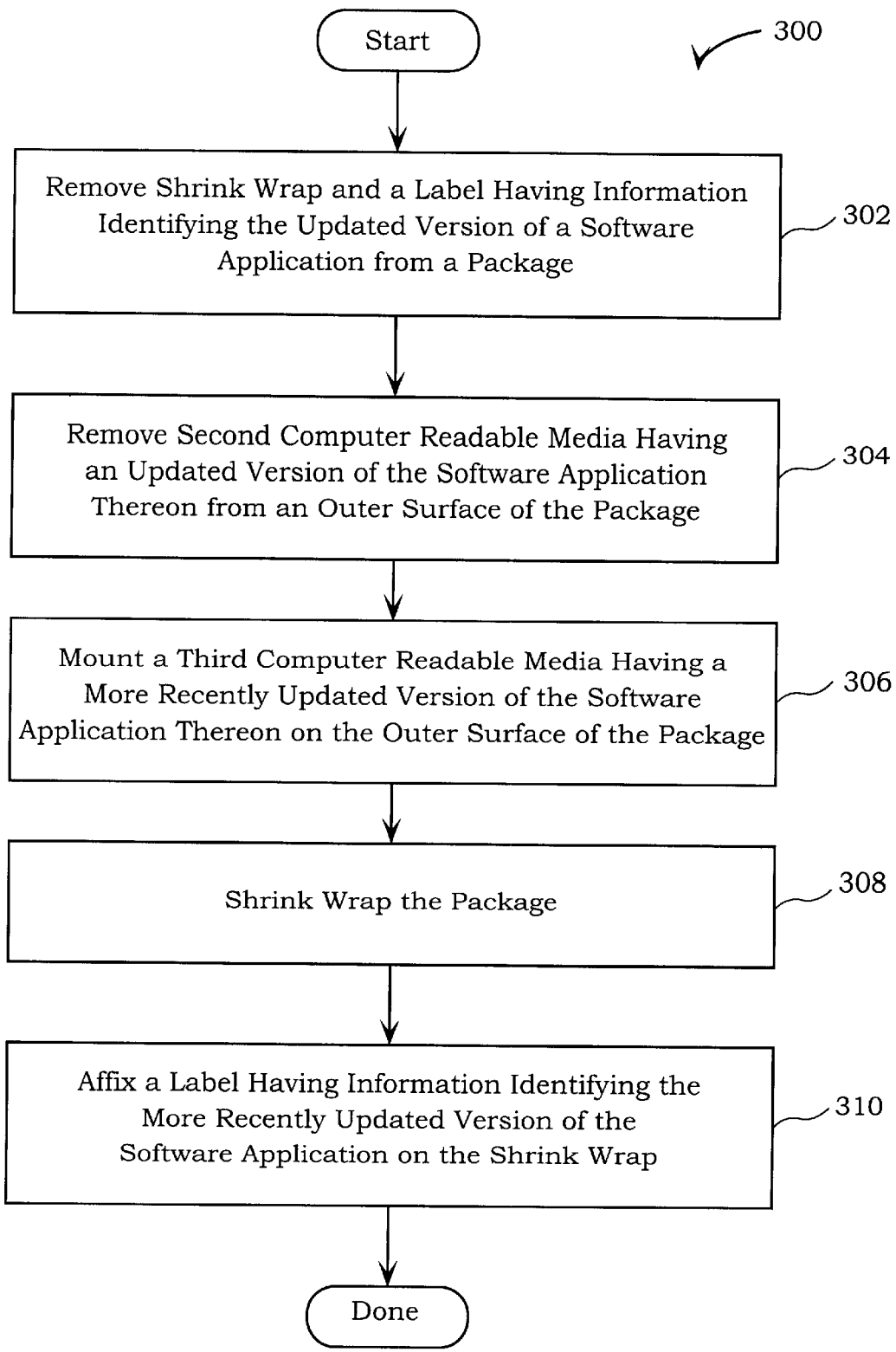
FIG. 8 is a flowchart diagram illustrating the method operations performed in reworking packaged software applications to include an updated version of the software application in accordance with one embodiment of the invention.

FIG. 8 is a flowchart diagram 300 illustrating the method operations performed in reworking packaged software applications to include an updated version of the software application in accordance with one embodiment of the invention. The method begins with operation 302 in which shrink wrap is removed from a package, e.g. a package assembled using the method for packaging a software application described above with reference to FIG. 7. If a label is affixed to the shrink wrap, e.g., a label providing information identifying the updated version of the software application as shown in FIG. 6, then the operation of removing the shrink wrap will simultaneously remove the label. It will be apparent to those skilled in the art that operation 302 is not necessary in situations where the package is not shrink wrapped.

The method continues to operation 304 in which the second computer readable media having an updated version of the software application thereon is removed from the outer surface of the package. In the embodiment in which the second computer readable media is a diskette mounted in slits formed in one of the panels of the package, the diskette may be removed by sliding it out of the slits. Next, in operation 306, a third computer readable media having an updated version of the software application stored thereon is mounted on the outer surface of the package. The updated version of the software application on the third computer readable media is more recent than the updated version on the second computer readable media. The third computer readable media may be any suitable computer readable media on which data can be stored. In one embodiment, the third computer readable media is the same type of media as the second computer readable media. In the embodiment in which the second computer readable media is a diskette mounted in slits formed in one of the panels of the package, the third computer readable media is preferably a diskette. In this embodiment, operation 306 entails mounting the diskette with the more recent version of the software application stored thereon, i.e., the third computer readable media, in the slits formed in one of the panels of the package to complete a diskette swap.

The method then proceeds to operation 308 in which the thus-assembled package is shrink wrapped. Finally, in operation 310, a new label is affixed to the shrink wrap. The details of operation 310 are essentially the same as the details of operation 210 described above with reference to FIG. 7. In one embodiment, the new label is a self-adhesive label on which information identifying the updated version of the software application stored on the third computer readable media is provided. Once the new label is affixed to the shrink wrap, the method is done.

In the foregoing method for reworking a packaged software application, it will be apparent to those skilled in the art that one or both of operations 308 and 310 may be omitted. In the event operation 308 is omitted and the package is therefore not shrink wrapped, operation 310 may be modified so that the label is applied directly to an outer surface of the package.

The package and method for packaging a software application of the present invention enable a software application provider to accommodate frequent changes to a software application efficiently. In particular, the package and method of the present invention obviate the need to rebuild packages entirely when the software application is changed. This is significant because it not only avoids wasting packaging material, but also enables a software application provider to keep packaged software applications in inventory without having to incur the costs associated with rebuilding the packages entirely when the software application is changed.

By shipping packaged software applications to distribution sites located near customers, a software application provider may significantly shorten delivery times to customers. When the software application is changed, the packaged software applications can be updated at the distribution sites simply by replacing the diskette (or other computer readable media) on the exterior of the package with another diskette (or other computer readable media) on which an updated version of the software application is stored.

In summary, the present invention provides a package and a method for packaging a software application. The invention has been described herein in terms of several exemplary embodiments. Other embodiments of the invention will be apparent to those skilled in the art from consideration of the specification and practice of the invention. For example, as discussed above, the configuration of the slits may be modified from that shown herein to accommodate a computer readable media other than a diskette. The embodiments and preferred features described above should be considered exemplary, with the invention being defined by the appended claims.

What is claimed is:

1. A package, comprising:

first and second panels defining a compartment having an opening, one of the first and the second panels having slits formed therein for receiving a computer readable media; and a flap for closing the opening of the compartment without obstructing the slits formed in one of the first and the second panels, wherein the compartment is configured to receive a first computer readable media, and the computer readable media received in the slits formed in one of the first and second panels is a second computer readable media;

wherein the slits formed in one of the first and second panels include a first slit and a second slit, each of the first and second slits having a first end, a vertical segment, a horizontal segment, and a second end;

wherein the vertical segments of the first and second slits have a first length and the horizontal segments of the first and second slits have a second length, the first length being longer than the second length;

wherein the vertical segments of the first and second slits are substantially parallel to one another, and the horizontal segments of the first and second slits extend away from their respective vertical segment in opposite directions.

2. The package of claim 1, wherein the first computer readable media is a compact disc and the second computer readable media is a diskette.

3. The package of claim 1, further comprising:

first and second side panels extending between the first and second panels, the first and second side panels being configured to allow expansion of the compartment.

4. The package of claim 1, wherein a transition region is provided at the first and second ends of each of the first and second slits, the transition region being configured to prevent the panel in which the first and second slits are formed from tearing.

* * * * *